United States Patent
Weichhold

(10) Patent No.: US 7,788,440 B2
(45) Date of Patent: Aug. 31, 2010

(54) METHOD AND DEVICE FOR COUPLING AT LEAST TWO INDEPENDENT BUS SYSTEMS

(75) Inventor: Peter Weichhold, Rosstal (DE)

(73) Assignee: Siemens Aktiengesellschaft, Munich (DE)

( * ) Notice: Subject to any disclaimer, the term of this patent is extended or adjusted under 35 U.S.C. 154(b) by 50 days.

(21) Appl. No.: 12/085,540

(22) PCT Filed: Nov. 27, 2006

(86) PCT No.: PCT/EP2006/068938
§ 371 (c)(1),
(2), (4) Date: May 27, 2008

(87) PCT Pub. No.: WO2007/060239
PCT Pub. Date: May 31, 2007

(65) Prior Publication Data
US 2009/0172239 A1  Jul. 2, 2009

(30) Foreign Application Priority Data
Nov. 28, 2005  (DE) ........................ 10 2005 056 709

(51) Int. Cl.
*G06F 13/38* (2006.01)
*G06F 13/36* (2006.01)
(52) U.S. Cl. ........................ 710/311; 710/310; 710/315
(58) Field of Classification Search ................... 710/310
See application file for complete search history.

(56) References Cited

U.S. PATENT DOCUMENTS

| | | | |
|---|---|---|---|
| 5,964,859 A | 10/1999 | Steinbach et al. | |
| 6,101,565 A | 8/2000 | Nishtala et al. | |
| 6,279,058 B1 | 8/2001 | Gulick | |
| 6,430,626 B1 | 8/2002 | Witkowski et al. | |
| 6,807,609 B1 | 10/2004 | Lemmon et al. | |
| 2005/0066104 A1* | 3/2005 | Train et al. | 710/305 |

FOREIGN PATENT DOCUMENTS

| | | |
|---|---|---|
| DE | 69031639 T2 | 2/1991 |
| DE | 10024267 A1 | 11/2001 |
| EP | 0843467 A1 | 5/1998 |

OTHER PUBLICATIONS

"Guidelines for planning and commissioning PROFIBUS DP/PA Field Communication"; Endress + Hauser; BA 034S; Jul. 2004; all pages.*
"SIMATIC DP/PA Bus Coupler";Siemens; EWA 4NEB 780 6020-02 03; Feb. 2000; all pages.*
"Instruction Manual/Manual Segment Coupler"; Pepperl + Fuchs; Sep. 16, 2002; all pages.*
Tanenbaum, Andrew S.; "Structured Computer Organization"; Prentice-Hall, Inc.; 1990; Third Edition; pp. 11-13.*

* cited by examiner

Primary Examiner—Ryan M Stiglic

(57) ABSTRACT

There is described a method for coupling at least two independent bus systems and to a suitable device for carrying out said method, a cycle time $T_A$, $T_B$ being assigned to each bus system and each data item from a sequence of data being transmitted to the bus of the respective bus system in its own cycle. A predetermined or predeterminable number of data items is buffered from a data sequence that is to be transmitted from the original bus system to the target bus system, and a respective data item is determined on the basis of the cycle time $T_B$ of the target bus system from the data buffered on the basis of cycle time $T_A$ of the original bus system.

8 Claims, 1 Drawing Sheet

METHOD AND DEVICE FOR COUPLING AT LEAST TWO INDEPENDENT BUS SYSTEMS

CROSS REFERENCE TO RELATED APPLICATIONS

This application is the US National Stage of International Application No. PCT/EP2006/068938, filed Nov. 27, 2006 and claims the benefit thereof. The International Application claims the benefits of German application No. 10 2005 056 709.6 DE filed Nov. 28, 2005, both of the applications are incorporated by reference herein in their entirety.

FIELD OF INVENTION

The invention relates to a method for coupling at least two independent bus systems (bus coupling) and to a suitable device (bus coupler) provided for carrying out the method.

BACKGROUND OF INVENTION

Bus coupling methods and devices provided for that purpose, i.e. bus couplers, are known per se. However, such known devices or methods are mainly designed to convert data to be transmitted from a first bus system (originating bus system) to another bus system (destination bus system) from a protocol used in the area of the originating bus system to a protocol used in the area of the destination bus system. In addition, bus coupling is also frequently used when it is necessary, in the case of long transmission distances, to refresh or boost signals. Such bus couplers are also known as repeaters.

SUMMARY OF INVENTION

There is described a bus coupling method which is suitable for transferring isochronous data between at least two independent bus systems and which ensures isochronicity of the data both on the part of the originating bus system and on the part of the destination bus system even if the two bus systems employ different and/or asynchronous cycle times.

This object can inventively achieved with the features of the method defined in an independent claim. In order to couple at least two independent bus systems, each bus system being assigned a cycle time and each data item from a sequence of data items (data sequence) being applied in its own cycle to the bus system, a predefined or predefinable number of data items from a data sequence intended for transmission from the originating bus system to a destination bus system is buffered. From the buffered data, on the basis of the cycle time of the originating bus system a corresponding data item is determined on the basis of the cycle time of the destination bus system.

The above-mentioned object is also achieved in the same way with a device having means of carrying out the above-mentioned method or its embodiments described below. Preferably such a device and the means incorporated therein is an apparatus with processing functionality such as a computer, possibly embodied as a so-called "embedded system", or an application-specific integrated circuit in which the individual steps are implemented in software or in combined form by the interaction of software with suitable hardware.

The advantage of the invention is that, with the buffering of the predefined and predefinable number of data items from the data sequence from the originating bus system, a database is available which makes it possible to determine an instantaneous value on the basis of the cycle time of the destination bus system.

Preferably the data sequence intended for transmission from the originating bus system to at least one destination bus system is a sequence of quantized analog values, i.e. process signals, for example, which represent the characteristic of an external measured value, such as a temperature curve or the like. Said measured values are cyclically recorded e.g. by means of a decentralized peripheral unit in the area of the originating bus system at equidistant points in time, said points in time resulting from or arising on the basis of the cycle time of the originating bus system, and are converted by means of the inventive method to the basis of the cycle time of the destination bus system.

The dependent claims are directed to preferred embodiments of the present invention.

The determination of the data item on the basis of the cycle time of the destination bus system is preferably performed by extrapolation, all known extrapolation algorithms being possible as the mathematical basis for the extrapolation.

If the at least two bus systems are clock-synchronous bus systems in each case, the mathematical complexity for the extrapolation is reduced.

Preferably the cycle time of the originating bus system, the cycle time of the destination bus system and an offset between the cycles of the two bus systems are stored so that the extrapolation can take place on the basis of these values. Using these parameters, the different time bases in the two systems, i.e. originating bus system and destination bus system, and their relationship to one another, are described in a manner that is adequate for the extrapolation.

In another preferred embodiment of the invention, the buffered data is filtered, said filtering being performed e.g. by suppressing individual bit changes in the historical values, i.e. in the buffered data, thereby advantageously reducing the quantizing noise in the extrapolated characteristic of the data transmitted to the destination bus system. In addition, further filtering is possible in order to obtain an even better correlation of the value characteristic in the two coupled bus systems. Moreover, in the event of missing values for a particular time period, it is possible to continue the extrapolation using the existing values. This enables transient disturbances in the value characteristic on the part of the originating bus system to be bridged. If the cycle time of the destination bus system is much shorter than the cycle time of the originating bus system, intermediate data points in the value characteristic are calculated using additional extrapolations and transmitted to the destination bus system as an additional data item, likewise on the basis of the cycle time of the destination bus system.

The particular advantage of the invention and its embodiments is that two or more bus systems, in particular two or more field buses with real-time capability, can be coupled in a clock-synchronous manner without additional measures such as delay elements or the like in the individual bus systems involved. Each bus system can retain its own cycle so that accordingly no synchronization measures which would affect the particular bus system are required either. In addition, different types of bus system in which a synchronization measure is not possible because of rigidly defined cycle rasters can be coupled.

The claims filed with the application are formulation proposals without prejudice to the attainment of broader patent protection. The applicant reserves the right to claim additional combinations of features only disclosed so far in the description and/or drawings.

Back-references used in the dependent claims relate to further refinements of the subject matter of the main claim by virtue of the features of the particular dependent claim; they are not to be understood as a waiver of the right to independent, objective protection for the combination of features of the referred-back dependent claims. In addition, having regard to an interpretation of the claims in the case of a more detailed concretization of a feature in a subordinate claim, it is to be assumed that such a restriction does not exist in the respective preceding claims.

As the subject matters of the dependent claims with regard to the prior art can form separate and independent inventions on the priority date, the applicant also reserves the right to make them the subject matter of independent claims or declarations of division. Furthermore, they can also contain independent inventions that have a design which is independent of the subject matters of the preceding dependent claims.

BRIEF DESCRIPTION OF THE DRAWINGS

An exemplary embodiment of the invention will now be explained in greater detail with reference to the accompanying drawings. Mutually corresponding objects or elements are provided with the same reference characters in all the figures, in which.

DETAILED DESCRIPTION OF INVENTION

Figure 1:
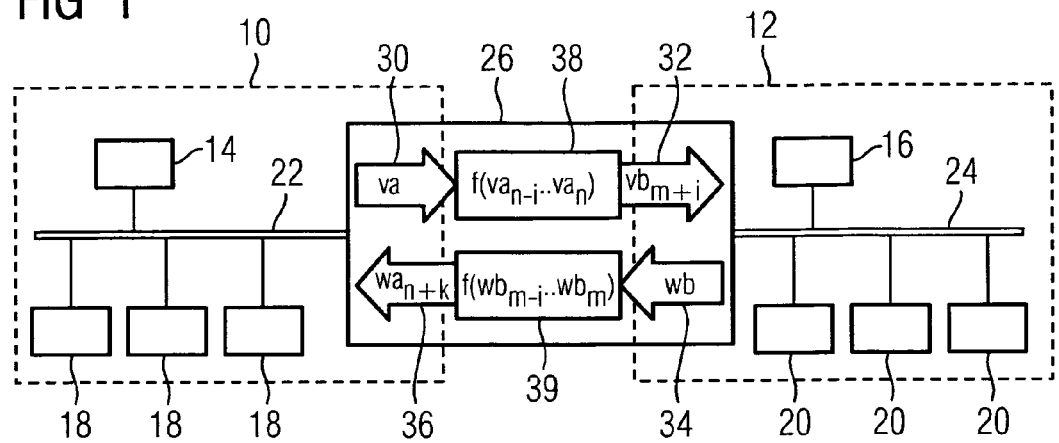
FIG. 1 shows a schematically simplified representation of two coupled bus systems and FIG. 2 shows a graph of a measured value.

FIG. 1 shows a first bus system 10 (originating bus system 10) coupled to a second bus system 12 (destination bus system 12) as an example of coupling of independent bus systems. Each bus system 10, 12 comprises a plurality of communication terminals 14, 16; 18, 20 including, for example, a control system 14, 16 and a number of so-called field devices 18, 20. The individual communication terminals 14, 18; 16, 20 are communicatively interconnected within the respective bus system 10, 12 via a bus 22, 24, in particular a field bus, e.g. the so-called PROFIBUS.

For coupling of the two bus systems 10, 12 there is provided a bus coupler 26 which is connected both to the bus 22 of the originating bus system 10 and to the bus 24 of the destination bus system 12. The bus coupler 26 is designed to couple at least two independent bus systems 10, 12, i.e. as a coupling between the originating bus system 10 and the destination bus system 12 in the example illustrated. From a sequence of data 28 (FIG. 2)—data sequence 30—to be transmitted from the originating bus system 10 to the destination bus system 12, a predefined or predefinable number of data items 28 are buffered in the area of the bus coupler 26. For this purpose the bus coupler 26 has a memory (not shown in greater detail but known per se). From the buffered data 28 the bus coupler 26 generates a data item 32 intended for forwarding to the destination bus system 12. In this context, the terms "originating bus system" 10 and "destination bus system" 12 are selected arbitrarily and purely for differentiation purposes; bus coupling can obviously also take place from the second bus system 12 to the first bus system 10, so that a data item 36 for transmission to the first bus system 10 is then generated by means of the bus coupler 26 from a data sequence 34 arising in the area of the second bus system 12. An item of data 32, 36 for transmission to the respective destination bus system 12 is generated using extrapolation means 38, 39 whose function will now be described with reference to FIG. 2.

Figure 2:
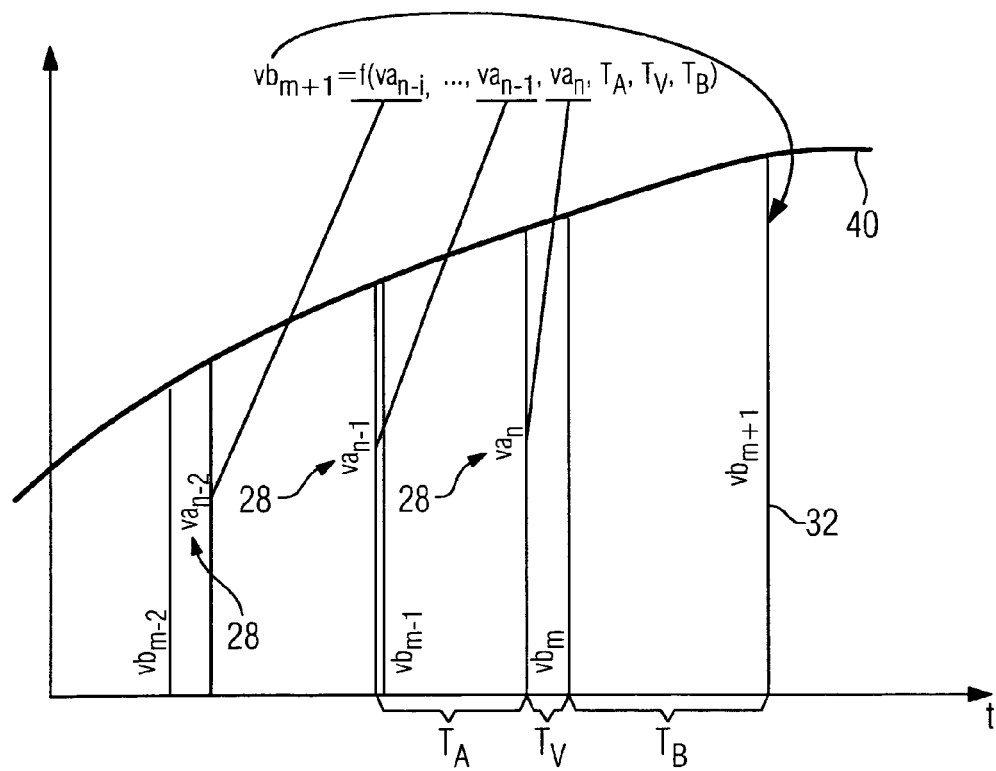

FIG. 2 shows a graph 40 of a measured value, i.e. the plot of a temperature curve, for example, which is sampled by means of one of the field devices 18 of the originating bus system 10 by cyclically recording individual measured values ($va_{n-2}$, $va_{n-1}$, $va_n$) as a data item 28. These measured values ($va_{n-2}$, $va_{n-1}$, $va_n$) are recorded at essentially equidistant points in time, the gap between two adjacent measured values 28 being essentially predefined by a cycle time of the respective bus system 10, 12, i.e. that of the originating bus system 10 in this case. The cycle time of the originating bus system is labeled $T_A$ in the coordinate system in FIG. 2. The cycle time of a bus system 10, 12 is derived in per se known manner on the basis of the so-called bus protocol provided for the transmission of data via the respective bus 22, 24 of the bus system 10, 12.

The coupling of at least two bus systems 10, 12 according to the invention is designed to take place such that, on the basis of data 28 describing the graph 40 of an external measured value on the part of the originating bus system 10, a data item 32 (and in the case of multiple repetition of the method, correspondingly a plurality of data items 32) is generated describing the same graph 40 or at least essentially the same graph 40 on the part of the destination bus system 12, direct transmission of the data 28 from the originating bus system 10 to the destination bus system 12 generally not being possible because the two bus systems 10, 12 have different bus cycle times, the bus cycle time of the destination bus system 12 being labeled $T_B$ in FIG. 2. The extrapolation means 38, 39 each generate from a plurality of buffered data 28 a data item 32 for transmission to the respective destination bus system 12. This is symbolically expressed in FIG. 2 as $$vb_{m+1} = f(va_{n-i}, \ldots, va_{n-1}, va_n, T_A, T_V, T_B),$$

where $va_{n-i}, \ldots, va_{n-1}, va_n$ denotes a predefined or predefinable number of data 28 (data sequence 30) from the originating bus system 10, $T_A$ the cycle time of the originating bus system 10, $T_B$ the cycle time of the destination bus system 12 and $T_V$ an offset between the bus cycles of the two bus systems 10, 12.

The data item 32 generated in the example in FIG. 2 in this way for transmission to the destination bus system 12 is the value $vb_{m+1}$.

It is readily apparent that, by repeating the method, further values can be generated on the graph 40 in synchronism with the bus cycle of the respective destination bus system 12. This produces for the destination bus system 12 a sequence of data 32 describing the graph 40 by means of an equidistant sequence of data points corresponding to a time pattern predefined by the bus cycle time of the destination bus system 12. This ensures that processing of the external process signals predefined by the graph 40 takes place in the two coupled bus systems 10, 12 in such a way that the bus systems 10, 12 operate on the basis of an identical or at least approximately identical plot of the graph 40.

In order better to visualize how the invention works, it may be imagined that only the measured value $va_j$ would ever be transferred to the destination bus system 12 as measured value $vb_k$, i.e. as shown in FIG. 2, for example, the measured value $va_n$ as measured value $vb_m$. As in the area of the destination bus system 12 the measured value $vb_m$ can only be processed within the bus cycle obtaining there, it is processed "too late" in respect of the actual shape of the graph 40, namely too late by precisely the offset $T_V$. The result for the destination bus system 12 would be that at the point in time at which the data item $vb_m$ is evaluated, an excessively low value of the external signal would be assumed. Depending on the current offset of the asynchronous bus cycles of the respective coupled bus systems 10, 12, the error may be considerable here. However, at the very least, without the invention it cannot be ensured that the two bus systems 10, 12 can operate on the basis of an identical or at least approximately identical process signal characteristic.

The invention may be summarized as follows: A method for coupling at least two independent bus systems 10, 12 and a device intended and suitable for carrying out said method are proposed, wherein each bus system 10, 12 is assigned a cycle time $T_A$, $T_B$ and each data item 28 is applied to the bus 22, 24 of the respective bus system 10, 12 from a sequence of data 28 (data sequence 30) in its own cycle, a predefined or predefinable number of data items 28 from a data sequence 30 intended for transmission from the originating bus system 10 to a destination bus system 12 being buffered and, from the buffered data 28, on the basis of the cycle time $T_A$ of the originating bus system 10, a corresponding data item 32 being determined on the basis of the cycle time $T_B$ of the destination bus system 12.

The invention claimed is:

1. A method for coupling at least two independent bus systems, wherein a different cycle time is assigned to each bus system, comprising:
    (a) buffering in a memory of a bus coupler connected between a first bus system having a first cycle time and a second bus system having a second cycle time a predefined number of first data items from a data sequence, wherein the first data items comprise sampled values of a measured value recorded according to a first sampling rate defined by the first cycle time, wherein the sampled values describe a graph of the measured value;
    (b) calculating an offset between the first cycle time and the second cycle time; and
    (c) determining a second data item by an extrapolation function that extrapolates a next value for the graph of the measured value, the extrapolation function based on the first data items, the first cycle time, the second cycle time, and the offset;
    (d) transmitting the second data item to the second bus system;
    (e) repeating steps (a) through (d) to generate a plurality of second data items that substantially describe the graph of the measured value according to a second sampling rate defined by the second cycle time.

2. The method as claimed in claim 1, wherein for the first cycle time $T_A$, the second cycle time $T_B$, the offset $T_V$, and the first data items ($va_{n-i}, \ldots, va_{n-1}, va_n$), the extrapolation function for extrapolating the next value $vb_{m+1}$ for the graph is expressed as $$vb_{m+1} = f(va_{n-i}, \ldots, va_{n-1}, va_n, T_A, T_V, T_B).$$

3. The method as claimed in claim 1, wherein the at least two bus systems are each clock-synchronous bus systems.

4. The method as claimed in claim 1, wherein the first data items are filtered.

5. A computer readable medium encoded with a computer program to provide a method for coupling at least two independent bus systems, wherein a different cycle time is assigned to each bus system, comprising:
    (a) buffering in a memory of a bus coupler connected between a first bus system having a first cycle time and a second bus system having a second cycle time a predefined number of first data items from a data sequence, wherein the first data items comprise sampled values of a measured value recorded according to a first sampling rate defined by the first cycle time, wherein the sampled values describe a graph of the measured value;
    (b) calculating an offset between the first cycle time and the second cycle time;
    (c) determining a second data item by an extrapolation function that extrapolates a next value for the graph of the measured value, the extrapolation function based on the first data items, the first cycle time, the second cycle time, and the offset;
    (d) transmitting the second data item to the second bus system; and
    (e) repeating steps (a) through (d) to generate a plurality of second data items that substantially describe the graph of the measured value according to a second sampling rate defined by the second cycle time.

6. The computer readable medium as claimed in claim 5, wherein the at least two bus systems are each clock-synchronous bus systems.

7. The computer readable medium as claimed in claim 5, wherein the first data items are filtered.

8. The computer readable medium as claimed in claim 5, wherein for the first cycle time $T_A$, the second cycle time $T_B$, the offset $T_V$, and the first data items ($va_{n-i}, \ldots, va_{n-1}, va_n$), the extrapolation function for extrapolating the next value $vb_{m+1}$ for the graph is expressed as $$vb_{m+1} = f(va_{n-i}, \ldots, va_{n-1}, va_n, T_A, T_V, T_B).$$

* * * * *